US012115724B2

(12) United States Patent
Ota et al.

(10) Patent No.: US 12,115,724 B2
(45) Date of Patent: Oct. 15, 2024

(54) THREE-DIMENSIONAL OBJECT PRINTING SYSTEM AND THREE-DIMENSIONAL OBJECT PRINTING METHOD

(71) Applicant: WILL BEE CO., LTD, Tokyo (JP)

(72) Inventors: Makoto Ota, Tokyo (JP); Haruhiko Moriguchi, Tokyo (JP); Shigeru Sato, Sagamihara (JP)

(73) Assignee: WILL BEE CO., LTD, Tokyo (JP)

( * ) Notice: Subject to any disclaimer, the term of this patent is extended or adjusted under 35 U.S.C. 154(b) by 409 days.

(21) Appl. No.: 17/632,605

(22) PCT Filed: Jun. 10, 2020

(86) PCT No.: PCT/JP2020/022868
§ 371 (c)(1),
(2) Date: Feb. 3, 2022

(87) PCT Pub. No.: WO2021/039024
PCT Pub. Date: Mar. 4, 2021

(65) Prior Publication Data
US 2022/0274341 A1    Sep. 1, 2022

(30) Foreign Application Priority Data
Aug. 29, 2019  (JP) .................................. 2019-156844

(51) Int. Cl.
*B29C 64/182*  (2017.01)
*B29C 64/245*  (2017.01)
(Continued)

(52) U.S. Cl.
CPC .......... *B29C 64/182* (2017.08); *B29C 64/245* (2017.08); *B29C 64/386* (2017.08);
(Continued)

(58) Field of Classification Search
CPC ................ B29C 64/171; B29C 64/182; B29C 64/386; B29C 64/393; B33Y 50/00; B33Y 50/02; B22F 10/80; B22F 10/85
See application file for complete search history.

(56) References Cited

U.S. PATENT DOCUMENTS 7,508,515 B2 *  3/2009  Hanina ................ H05K 3/0082
                                                  430/30
10,369,746 B2 *  8/2019  Inoue .................... B29C 64/386
(Continued)

FOREIGN PATENT DOCUMENTS

EP          3405972 A1    11/2018
JP       2006-335019 A    12/2006
(Continued)

OTHER PUBLICATIONS

International Search Report for International Application No. PCT/JP2020/022868 dated Aug. 25, 2020, Japan, 2 pages.

*Primary Examiner* — Atul P. Khare
(74) *Attorney, Agent, or Firm* — United IP Counselors, LLC

(57) ABSTRACT

A three-dimensional object printing system includes: a printing table for a plurality of three-dimensional objects to be placed on, the printing table having a plurality of detection reference marks; detecting means for detecting positions and orientations of the three-dimensional objects placed on the printing table and the detection reference marks; printing data generating means generating printing data corresponding to the three-dimensional objects based on the positions and orientations of the three-dimensional objects detected by the detecting means, the printing data generating means obtaining reference coordinates of the detection reference marks based on part of the detection reference marks; and printing means for executing printing on the three-dimen-
(Continued)

sional objects using the printing data generated by the printing data generating means.

6 Claims, 15 Drawing Sheets

(51) Int. Cl.
*B29C 64/386* (2017.01)
*B29C 64/393* (2017.01)
*B33Y 10/00* (2015.01)
*B33Y 30/00* (2015.01)
*B33Y 50/00* (2015.01)
*B33Y 50/02* (2015.01)
*B33Y 80/00* (2015.01)

(52) U.S. Cl.
CPC .......... *B29C 64/393* (2017.08); *B33Y 10/00* (2014.12); *B33Y 30/00* (2014.12); *B33Y 50/00* (2014.12); *B33Y 50/02* (2014.12)

(56) References Cited

U.S. PATENT DOCUMENTS

| | | | |
|---|---|---|---|
| 11,198,182 B2 * | 12/2021 | Worthing, Jr. | .......... B22F 10/85 |
| 11,633,969 B2 * | 4/2023 | Miyazaki | ............. H10K 71/135 |
| | | | 427/466 |
| 2017/0282594 A1 | 10/2017 | Akao et al. | |
| 2018/0126629 A1 * | 5/2018 | Staal | ..................... B29C 64/393 |
| 2019/0023003 A1 | 1/2019 | Verheijen et al. | |
| 2020/0055255 A1 | 2/2020 | Ota et al. | |

FOREIGN PATENT DOCUMENTS

| | | |
|---|---|---|
| JP | 2010-131879 A | 6/2010 |
| JP | 2011-011471 A | 1/2011 |
| JP | 2017-177578 A | 10/2017 |
| JP | 2018-187915 A | 11/2018 |
| WO | 2017/126967 A1 | 7/2017 |
| WO | 2018/198832 A1 | 11/2018 |

* cited by examiner

PRIOR ART

THREE-DIMENSIONAL OBJECT PRINTING SYSTEM AND THREE-DIMENSIONAL OBJECT PRINTING METHOD

CROSS-REFERENCE TO RELATED APPLICATIONS

This application is a National Stage Entry application of PCT International Application No. PCT/JP2020/022868, filed on Jun. 10, 2020, which claims the priority benefit of Japanese Patent Application No. 2019-156844, filed on Aug. 29, 2019, the entire contents of both of which are hereby incorporated by reference.

BACKGROUND

1. Technical Field

The present invention relates to a three-dimensional object printing system and a three-dimensional object printing method.

2. Description of the Background

A conventional three-dimensional object printing device that prints an image on a three-dimensional object includes: an inkjet recording head; and a three-dimensional object holder that rotatably holds a three-dimensional object having the side of the three-dimensional object opposed to a nozzle surface of the recording head. While the three-dimensional object holder is rotating the three-dimensional object, the recording head prints an image on the side surface of the three-dimensional object (for example, see JP 2006-335019 A).

BRIEF SUMMARY

In the conventional three-dimensional object printing device, the three-dimensional object holder rotates a single three-dimensional object. Therefore, the conventional three-dimensional object printing device is low in productivity in printing images on a plurality of three-dimensional objects.

Addressing the problem, there has been proposed a three-dimensional object printing system that dispenses with the rotational control on a three-dimensional object and achieves high-definition printing without using any fixing jig.

Specifically, the proposed three-dimensional object printing system detects the position and orientation of each three-dimensional object placed on a printing table, generates printing data corresponding to each three-dimensional object based on the detection result, and carries out printing on each three-dimensional object using the generated printing data.

Here, the three-dimensional object printing system generates accurate printing data from the positional information between a detection reference mark, for example, and a three-dimensional object. Therefore, the three-dimensional object cannot be placed on a location where it would hide the detection reference mark.

Accordingly, in some cases, three-dimensional objects cannot be densely disposed on the printing table depending on the size of the three-dimensional objects and the size of the reading area. This limits the number of the three-dimensional objects per print and hence reduces printing efficiency.

Even when the three-dimensional objects can be densely disposed on the printing table, the three-dimensional objects must be disposed avoiding hiding the detection reference marks. This requires time and effort in disposing the three-dimensional objects on the printing table and hence reduces production efficiency.

An object of the present invention is to provide a three-dimensional object printing system and a three-dimensional object printing method which allow three-dimensional objects to be disposed in high density on a printing table and thus achieve improved printing efficiency.

A first aspect of the present invention provides a three-dimensional object printing system including:
- a printing table for a plurality of three-dimensional objects to be placed on, the printing table having a plurality of detection reference marks;
- detecting means for detecting positions and orientations of the three-dimensional objects placed on the printing table and the detection reference marks;
- printing data generating means for generating printing data corresponding to the three-dimensional objects based on the positions and orientations of the three-dimensional objects and the detection reference marks detected by the detecting means, the printing data generating means obtaining reference coordinates of the detection reference marks based on part of the detection reference marks; and
- printing means for executing printing on the three-dimensional objects using the printing data generated by the printing data generating means.

A second aspect of the present invention provides a three-dimensional object printing method including:
- placing a plurality of three-dimensional objects on a printing table having a plurality of detection reference marks to cover part of the detection reference marks;
- detecting, by detecting means, positions and orientations of the three-dimensional objects and the detection reference marks;
- generating, by the printing data generating means, printing data corresponding to the three-dimensional objects based on the positions and orientations of the three-dimensional objects and the detection reference marks being detected, and
- executing, by printing means, printing on the three-dimensional objects using the printing data.

The three-dimensional object printing system and the three-dimensional object printing method of the present invention allow the three-dimensional objects to be disposed in high density on the printing table and thus achieve improved printing efficiency.

DETAILED DESCRIPTION

Figure 1:
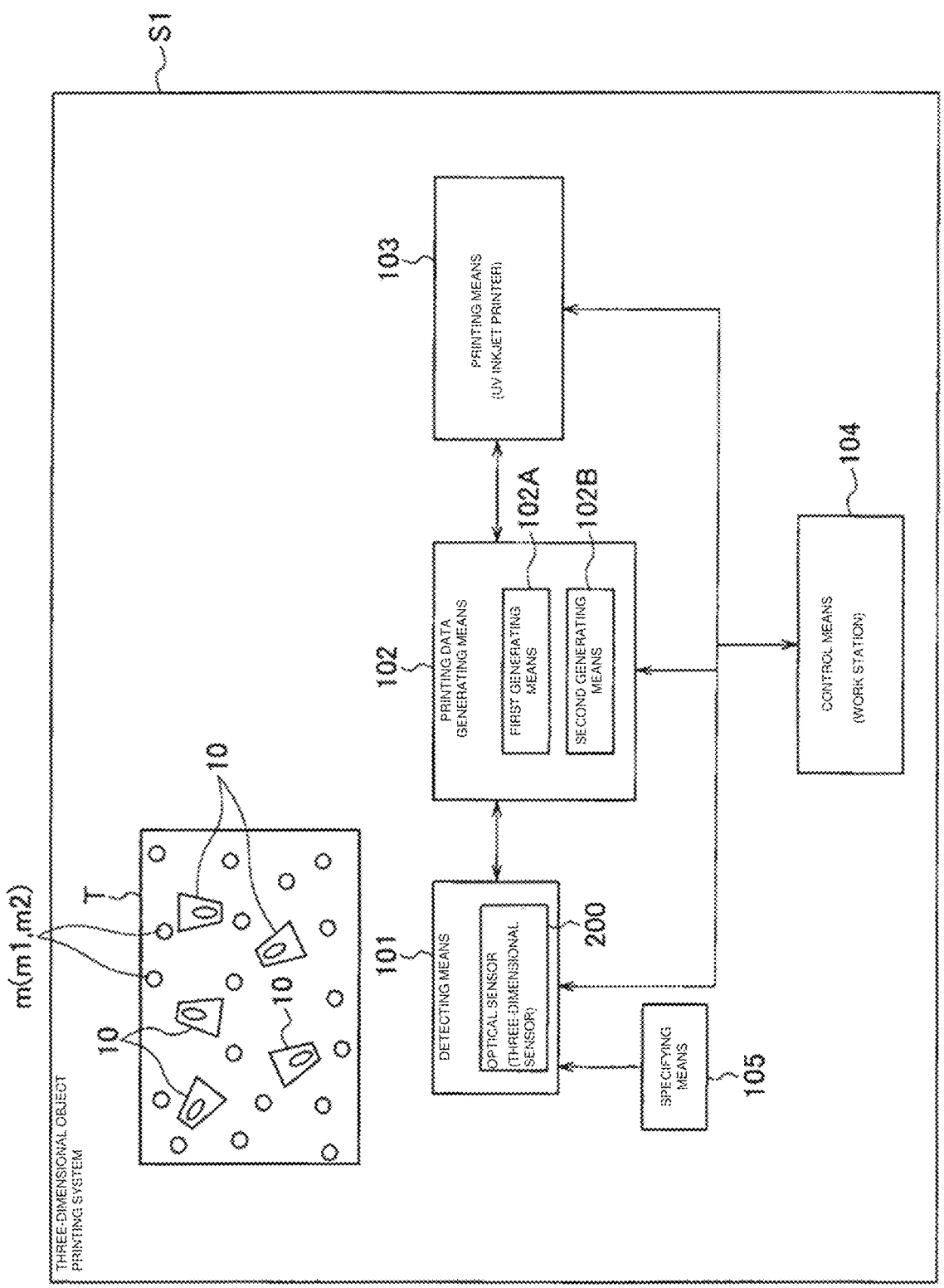
FIG. 1 is a functional block diagram of the overall configuration of a three-dimensional object printing system.

In the following, with reference to the drawings, a detailed description will be given of an embodiment of the present invention. In the drawings, identical parts are denoted by the same characters and redundant explanations are omitted. The present invention is not limited to the embodiment.

Embodiment

Figure 2:
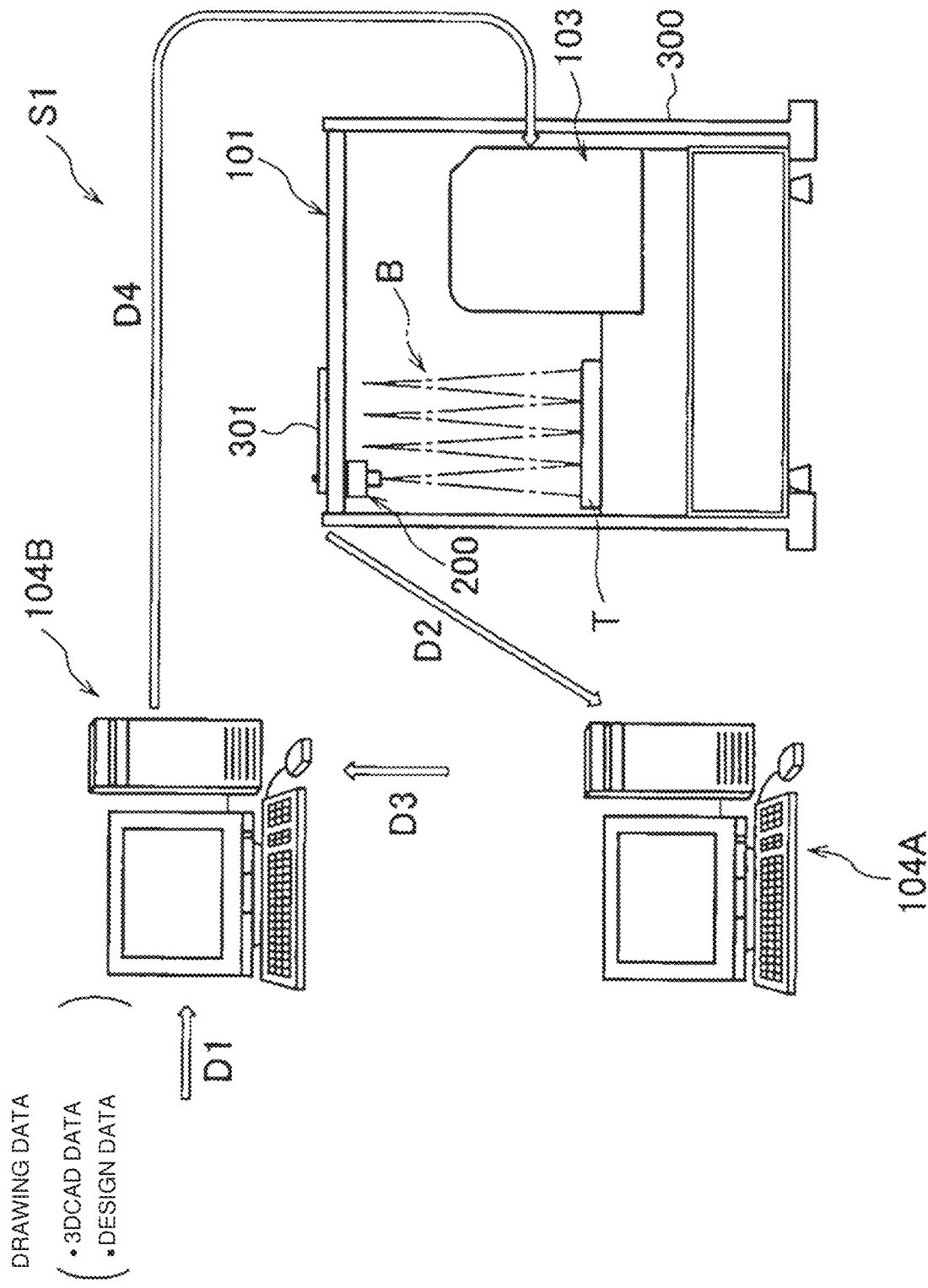
FIG. 2 is an explanatory illustration of an exemplary configuration of the three-dimensional object printing system.

With reference to FIGS. 1 and 2, a description will be given of an exemplary configuration of a three-dimensional object printing system S1 according to an embodiment.

FIG. 1 is a functional block diagram of the overall configuration of the three-dimensional object printing system S1 according to the embodiment. FIG. 2 is an explanatory illustration of an exemplary configuration of the three-dimensional object printing system S1.

As in FIG. 1, the three-dimensional object printing system S1 includes a printing table T, detecting means 101, printing data generating means 102, printing means 103, and control means 104. On the printing table T, a plurality of three-dimensional objects 10 as the print targets are placed. The detecting means 101 detects the position and orientation of each of the three-dimensional objects 10 placed on the printing table T. Based on the detection result from the detecting means 101, the printing data generating means 102 generates printing data corresponding to each three-dimensional object 10. Using the printing data generated by the printing data generating means 102, the printing means 103 executes printing on each three-dimensional object 10. The printing means 103 is, for example, a flatbed UV inkjet printer. The control means 104 controls the operations of the detecting means 101, the printing data generating means 102, and the printing means 103.

The detecting means 101 is, for example, an optical sensor (3D sensor) 200. The optical sensor 200 acquires the three-dimensional posture information of each three-dimensional object 10 placed on the printing table T.

Detection reference marks m (m1, m2) that can be detected by the optical sensor 200 are formed on the printing table T. Specific examples of the detection reference marks m (m1, m2) will be described later with reference to FIG. 6 and others.

The plurality of detection reference marks m (m1, m2) can be detected by the detecting means 101 within a prescribed reading area A10 set on the printing table T.

The optical sensor 200 is shiftable by an XY slider 301. Accordingly, as in FIG. 2, a field of view B of the optical sensor 200 on the printing table T disposed inside a casing 300 of the printer is also shiftable.

The shape, size, position, and number of the detection reference marks m (m1, m2) are set so that part or all of the detection reference marks m (m1, m2) is detected by the detecting means 101 between a plurality of three-dimensional objects 10 when the three-dimensional objects 10 are arbitrarily placed on the printing table T.

The detection reference marks m (m1, m2) each have a shape of a circle having a diameter of about 3 mm to 30 mm, for example. At least three detection reference marks m (m1, m2) are provided in the field of view of the detecting means 101.

In the example in FIG. 6, twenty-three circular detection reference marks m are provided in the field of view of the detecting means 101.

The detection reference marks m (m1, m2) may be formed by the printing means 103 printing on the printing table T. This allows the detection reference marks m (m1, m2) to be printed having their shape, size, position, and number adjusted depending on the size or number of the three-dimensional objects 10.

The preferable size of each detection reference mark m varies depending on the size of the printing table T, the size of the three-dimensional objects 10, 500 as the print target objects, and the size of the field of view of the detecting means 101.

For example, in the example in FIG. 6, the size of the field of view of the detecting means 101 (the size of the target area detected per imaging) is 75 mm×70 mm, and the diameter of each detection reference mark m (m1, m2) is 6 mm. In this case, the circular detection reference marks m each having a diameter of about 3 mm to 30 mm are preferably disposed by 3 to 60 in number within the field of view of the detecting means 101.

The shape of each detection reference mark m is most desirably a circle so that the reference coordinates of the center of a mark is obtained just by part of the contour of the mark.

Figure 12A:
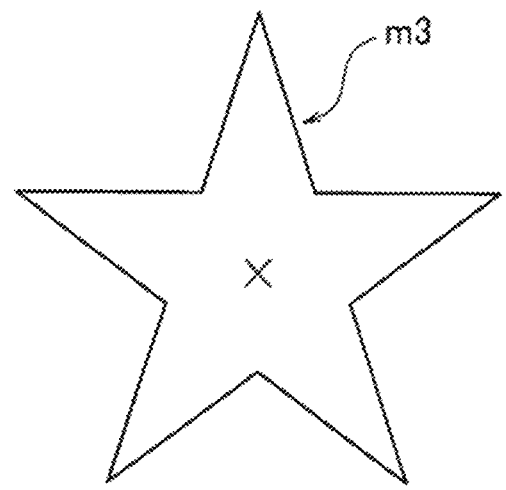
FIGS. 12A and 12B are each an explanatory illustration of other exemplary configuration of a detection reference mark.
Figure 12B:
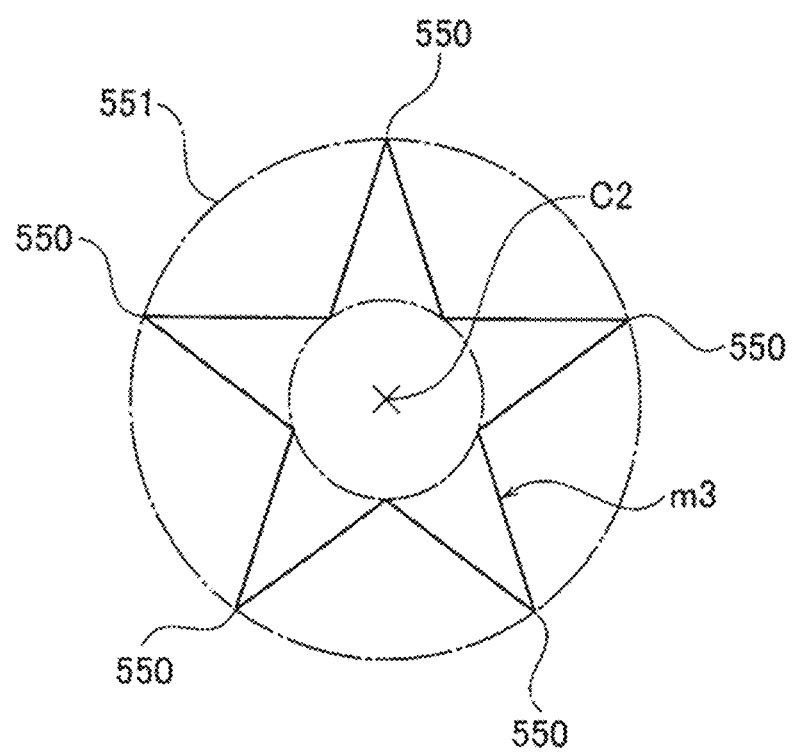

Note that, for example, with a star-shaped mark m3 as in FIG. 12A, a circle 551 connecting vertices 550 may be formed as in FIG. 12B, to obtain a center c2 of the circle.

Similarly, the detection reference marks m may each have any shape in addition to the circle and the star so long as the center of a circle is obtained. For example, when the mark is "x" as in FIG. 4B and is partially hidden, the two crossing lines should be partially detected. Then, by mathematically specifying the intersection of the lines, the detection reference coordinates can be obtained.

The detecting means 101 includes specifying means 105. The specifying means 105 includes display means (not illustrated) for previously specifying a plurality of detection points on the surface of the three-dimensional objects 10, and a pointing device such as a mouse for shifting and determining the specified points (not illustrated).

The detecting means 101 detects, for each three-dimensional object 10, the position of the detection points specified by the specifying means 105 and the position of the detection reference marks m (m1, m2).

The control means 104 includes, for example, work stations 104A, 104B. Based on the detected positions of the detection points and the detection reference marks m (m1, m2), the control means 104 calculates the position and rotation angle of each three-dimensional object 10 on the printing table T.

The printing data generating means 102 includes the work station 104B as hardware, and prescribed data processing software and others.

The printing data generating means 102 includes first generating means 102A and second generating means 102B. Based on the posture of each three-dimensional object 10 determined by the control means 104 and drawing information for printing on the surface of each three-dimensional object 10, the first generating means 102A generates first printing data (drawing data). According to the position and the rotation angle of each three-dimensional object 10 detected by the detecting means 101, the second generating means 102B applies a rotation process on the first printing data to generate optimized second printing data.

The optical sensor 200 may further include height detecting means for detecting the height of each three-dimensional object 10 placed on the printing table T. In this case, the printing data generating means 102 corrects the second printing data based on the height information of each three-dimensional object 10 detected by the height detecting means.

When the optical sensor (3D sensor) 200 acquires the three-dimensional posture information of each three-dimensional object 10 placed on the printing table T, the first generating means 102A generates the first printing data based on the detection result by the 3D sensor. According to the position and rotation angle of each three-dimensional object 10 acquired by the 3D sensor or other detecting means, the second generating means 102B applies a rotation process on the first printing data to generate the optimized second printing data.

Furthermore, the detecting means 101 detects the print state on the surface of each three-dimensional object 10. The control means 104 determines whether the printing is conforming based on the print state detection result.

Processing by First Generating Means

Here, a description will be given of the details of the processing by the first generating means 102A.

Firstly, 3DCAD data and design data are input to the first generating means 102A. The 3DCAD data has the three-dimensional shape information of the three-dimensional objects 10. The design data has the information relating to coloring and drawing on the surface of the three-dimensional objects 10.

The first generating means 102A receives the 3DCAD data including the posture information on the printing table T.

Note that, the posture that is most stable on the printing table T may be specified and determined by the 3DCAD data on the operation window of the work station 104B of the first generating means 102A.

Next, the 3DCAD data corresponding to the three-dimensional object posture information on the printing table T and the drawing information are combined, so that two-dimensional rendering data as a perspective image by collimated light is extracted.

Next, using the extracted two-dimensional rendering data and depth information corresponding to the rendering data, first printing data (drawing data) is generated.

More specifically, a printing device generally prints two-dimensional data on a plane. Therefore, the printing characteristics for depth spaced apart from a plane are different from the printing characteristics for a plane. Such depth printing characteristic different from those for a plane are previously saved. Referring to the saved characteristics, the optimum drawing data is generated from the depth information corresponding to the rendering data.

For example, with the inkjet printing device, the printing characteristics for depth depend on the flying characteristics of the ink droplets. Accordingly, in order to compensate for any variations in the printing characteristic caused by the poor landing accuracy of ink droplets for relatively distant locations, the rendering data is extended for the contour portion with depth to obtain the optimum drawing data.

Reading Reference Based on Printing Reference and Pattern Matching

The reference point of the positional information on the printing table T of each three-dimensional object 10 read by a digital camera must agree with the printing reference at high precision.

To this end, a print-use sheet is fixed onto the printing table T, and a plurality of detection reference marks m1 as exemplarily illustrated in FIG. 6 are printed on the print-use sheet. The positional relationship with the detection reference marks m1 is determined from imaging information. Then, the printing data is generated and printing is carried out.

Specifically, for example, onto the printing table T of size A3 (297 mm×420 mm), a PET film of an equivalent size is fixed. The detection marks are printed on each of areas A1 to A8 (see FIG. 4A).

Figure 6A:
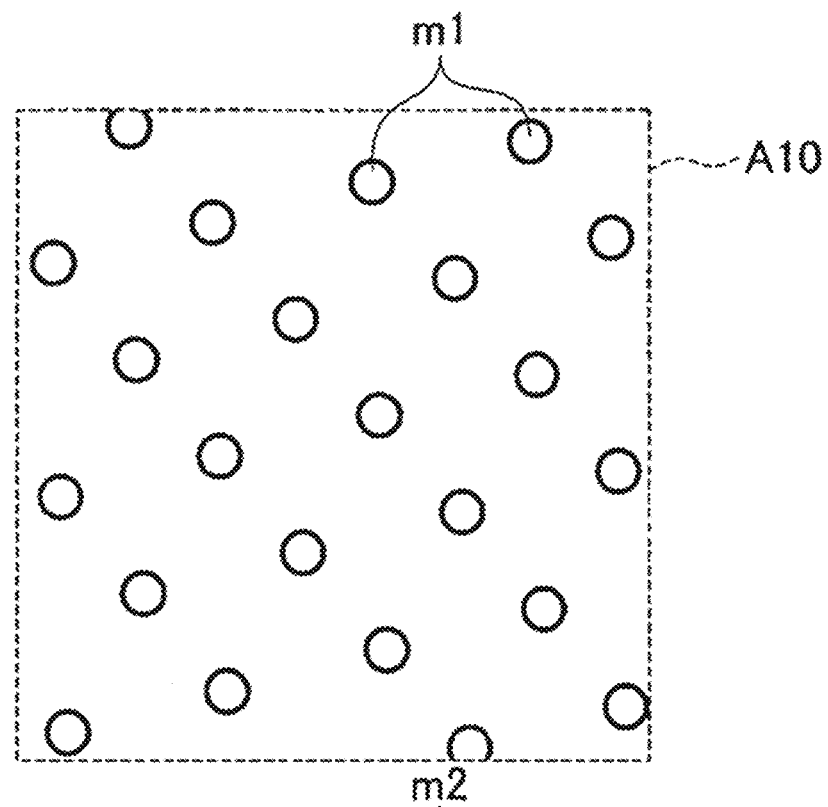
FIGS. 6A and 6B are each a plan view of a formation example of detection reference marks.

In the example in FIG. 6A, twenty-three circular detection reference marks m1 each having a diameter of 6 mm are printed in the area A10 at substantially regular intervals.

Figure 6B:
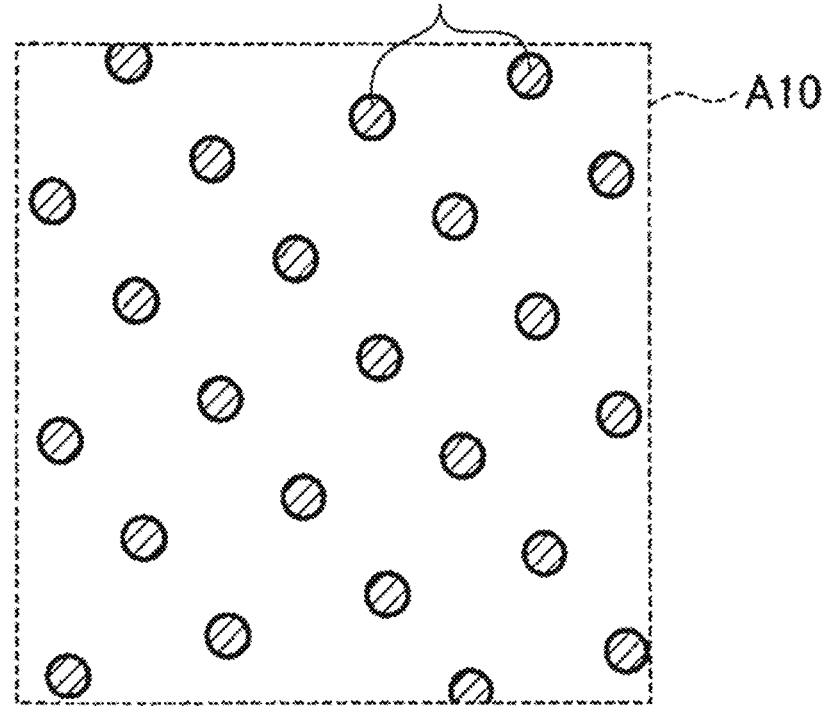

In the example in FIG. 6B, twenty-three filled-circular detection reference marks m2 each having a diameter of 6 mm are printed in the area A10 at substantially regular intervals.

The detection area imaged by the detecting means 101 measures 70 mm×75 mm, within which area the 23 pieces of detection reference marks m1, m2 are disposed. As described above, the number of the detection reference marks m1, m2 is preferably about at least 3 to 60.

No particular rules are required in arranging the detection reference marks m1, m2. However, the regular intervals in each detection area are preferable in terms of processing time.

The detecting means 101 detects the detection reference marks m1, m2 by pattern matching and the like, and determines the reference point by obtaining the center of each of the detection reference marks m1, m2.

Figure 13B:
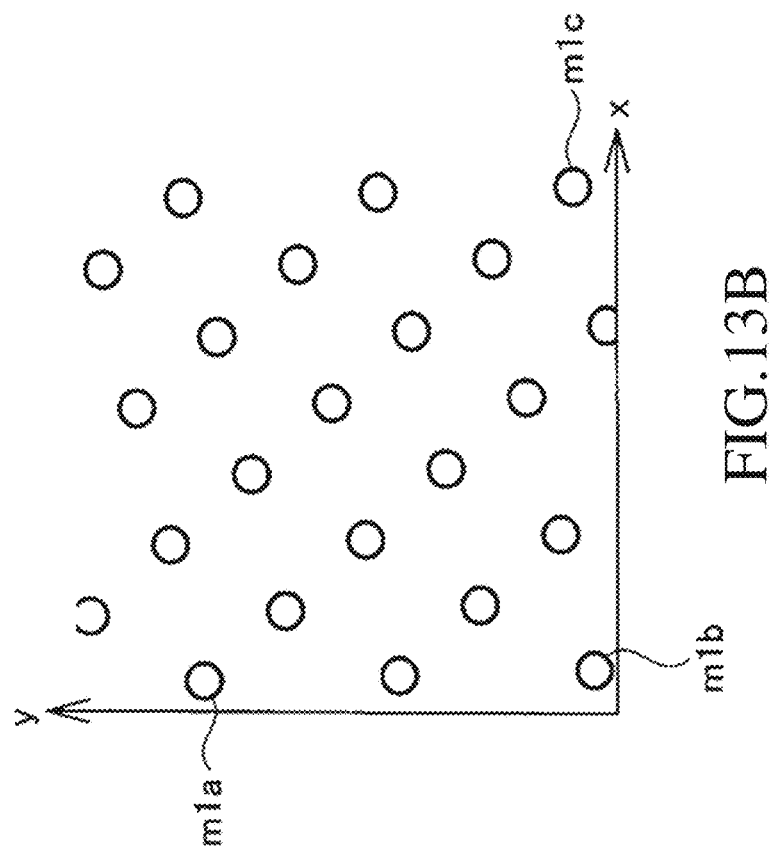
FIGS. 13A and 13B are each an explanatory illustration for the scheme of determining reference points by detection reference marks.
Figure 13A:
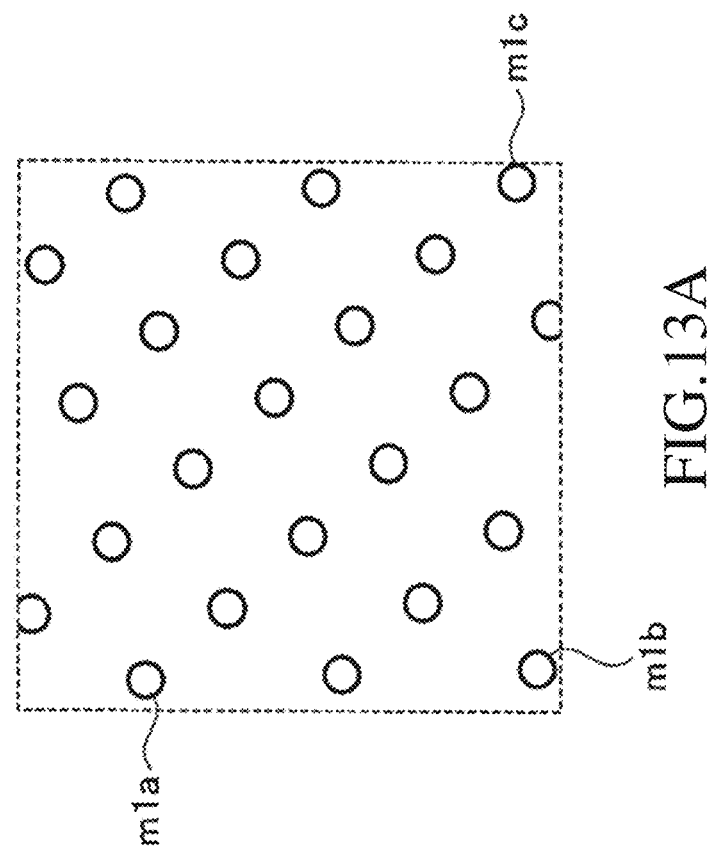

Here, with reference to FIG. 13, a brief description will be given of the scheme of determining the reference point (or the reference coordinates) using the detection reference marks m1, m2. Firstly, as illustrated in FIG. 13A, the coordinates as the printing reference are defined for each of the detection reference marks m1. For example, as in FIGS. 13A and 13B, the detecting means 101 detects three detection reference marks m1$a$ to m1$c$ in an acquired image. Using the three points m1$a$ to m1$c$, the printing data generating means 102 determines the reference coordinate axes x, y (see FIG. 13B) of the reading area. Thus, the accurate position of each three-dimensional object placed in the reading area is detected. In this manner, the printing reference of the printing means 103 and the detection reference are agreed with each other at high precision.

Note that, since the coordinates as the printing reference are defined for each detection reference mark, the obtaining the reference coordinates means associating the coordinates as the printing reference and the position of each detection reference mark with each other. Accordingly, it is also possible to associate the coordinates as the printing reference and the position of each detection reference mark with each other based on part of the detection reference marks m without obtaining the reference coordinates, to generate the printing data based on the position and orientation of each three-dimensional object 10 and the detection result of each detection reference mark.

Furthermore, in order to determine precisely and quickly the position and rotation angle (the rotation angle in the plane of the printing table T) of each three-dimensional object 10 from the imaging information from the digital camera, the feature points of at least two locations in the contour information of the three-dimensional object 10 are specified as reading reference points and the pattern matching processing is carried out.

Figure 3A:
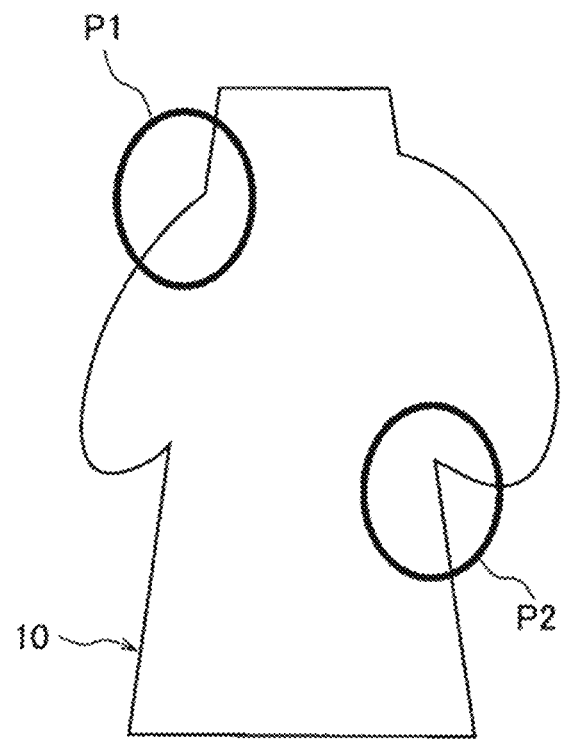
FIGS. 3A and 3B are each an explanatory illustration for the procedure of finding detection reference points by pattern matching.

For example, as in FIG. 3A, the contour information of the three-dimensional object 10 is previously acquired, and feature points P1, P2 of two locations in the contour is specified as the reading reference points. Next, pattern matching is carried out using the reading image information from the digital camera, to extract reading reference point Q1, Q2 (see FIG. 3B). After the two reading reference points Q1, Q2 are extracted, a barycenter position C and a rotation angle θ1 of the three-dimensional object 10 are determined.

Figure 3B:
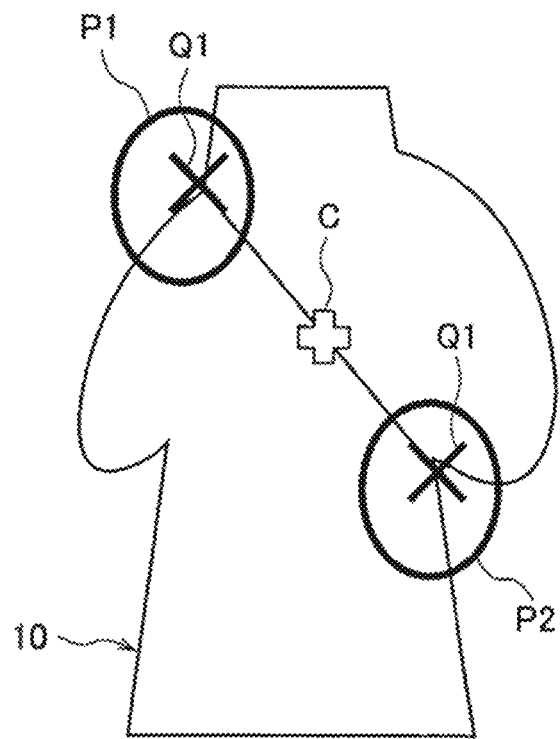
Figure 4A:
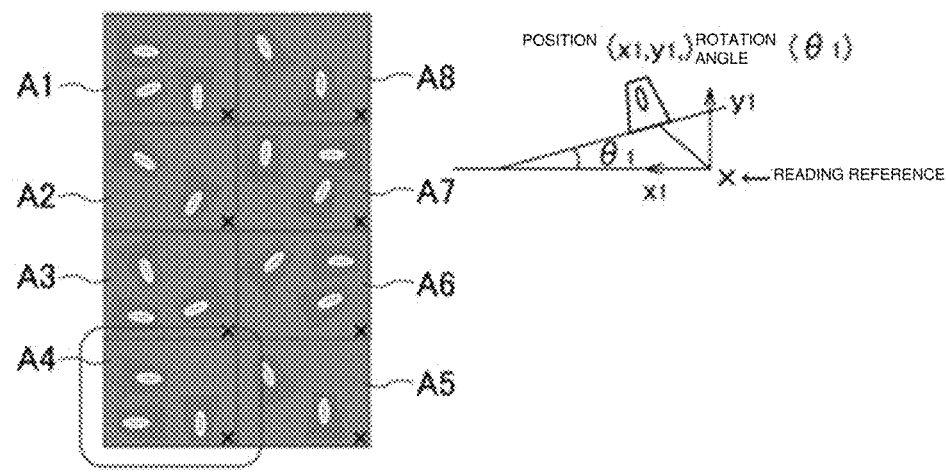
FIGS. 4A to 4C are each an explanatory illustration for the procedure of generating printing data.
Figure 4B:
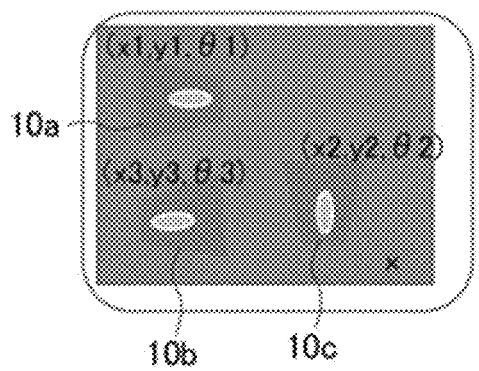
Figure 4C:
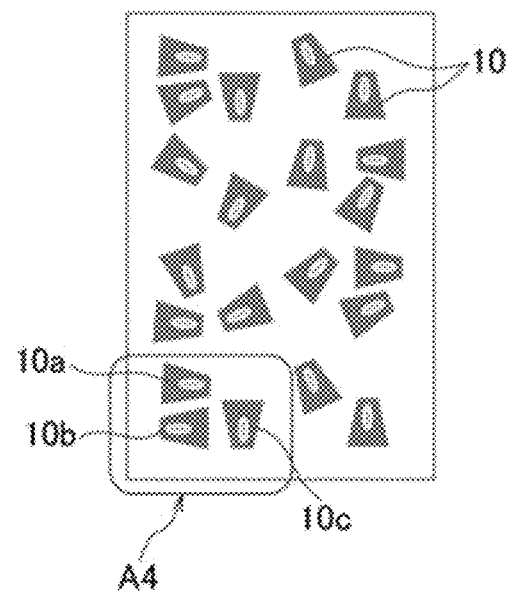

Using the contour information, as in FIGS. 3B and 4, at least two reading reference points are specified in order to detect the position and posture (the rotation angle θ1 within the plane of the printing table T) on the printing table T of the three-dimensional object 10.

In the example in FIG. 4A, in each of the areas A1 to A8 of the printing table T, two to three three-dimensional objects 10 are placed in random orientations. The images of the areas A1 to A8 of the printing table T in FIG. 4A are acquired by the detecting means 101 scanning in a zigzag manner, for example, in order of A1→A8→A7→A2→A3 . . . .

Here, for example with the area A4, as noted on one side in FIG. 4A, for each of the three-dimensional objects 10a to 10c, the position (x1, y1) and the rotation angle (θ1) are determined based on the reading reference point (see FIG. 4B).

Note that, the reading reference point in FIG. 4B is represented by mark "x".

Then, the information of the position and rotation angle θ1 of every three-dimensional object 10 disposed on the printing table T acquired as described above are transferred to the first generating means 102A that generates the first printing data (drawing data).

Next, the second generating means 102B applies a rotation process on the first printing data according to the position (x1, y1) and rotation angle (θ1) of each three-dimensional object 10, to generate the optimized second printing data.

Note that, in generating the second printing data, the position of the reading reference point and that of the printed data reference point may be set to agree with each other or to assume a prescribed value. This allows the reading determination position and the printed position to agree with each other at high precision.

In the example of FIG. 4A, the three-dimensional objects 10 are disposed in respective areas A1 to A8 of the printing table T. Here, in the case where a three-dimensional object 10 sits on the boundary of the areas A1 to A8, the processes can be carried out by combining such areas.

In the case where there are a plurality of three-dimensional objects or a plurality of pieces of drawing data, the application of the present invention similarly achieves high precision printing.

Comparative Example

Figure 5:
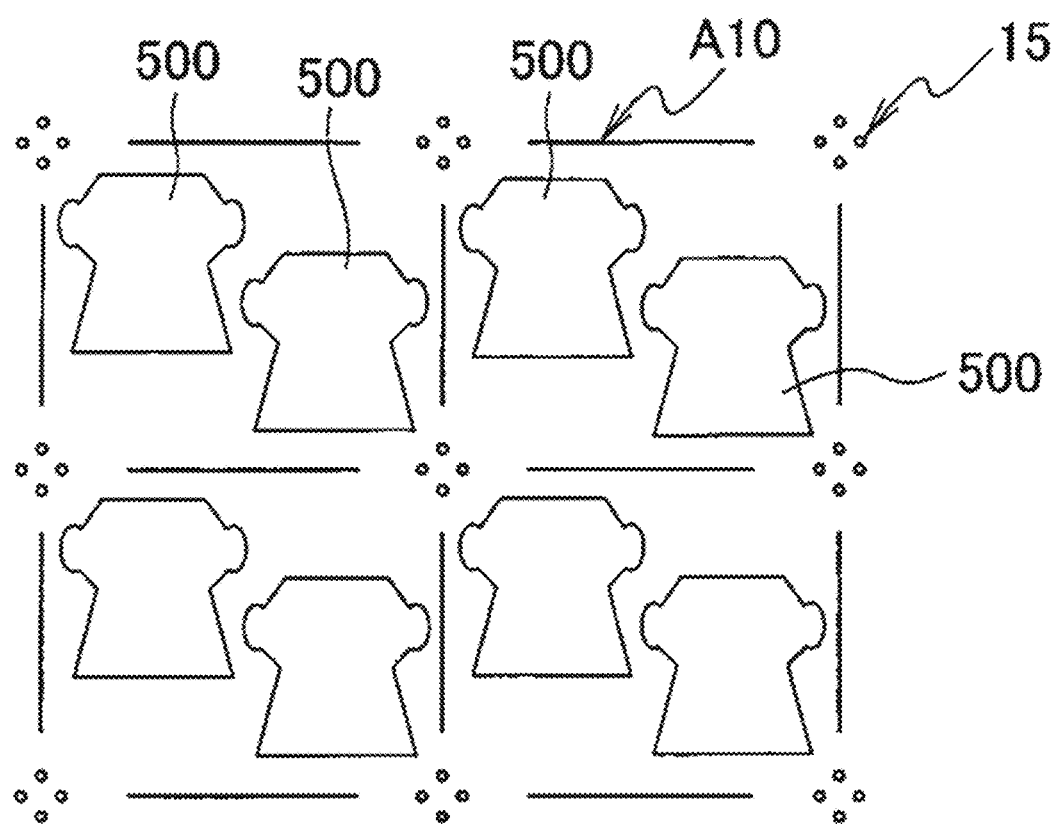
FIG. 5 is a plan view of an exemplary disposition of detection reference marks and three-dimensional objects in a three-dimensional object printing system of a comparative example.

With reference to FIG. 5, a description will be given of the exemplary disposition of the detection reference marks and the three-dimensional objects in a three-dimensional object printing system according to a comparative example.

In the three-dimensional object printing system according to the comparative example, as in FIG. 5, the detection reference marks 15 that can be detected by an optical sensor (3D sensor) are printed on the four corners of the printing table T. Then, the positional relationship with the detection reference marks 15 is determined by the imaging information. The printing data is generated and printing is carried out.

In the three-dimensional object printing system according to the comparative example, the accurate printing data is generated from the positional information between the detection reference marks 15 and three-dimensional objects 500. Therefore, the three-dimensional objects 500 cannot be placed at any positions where they may hide the detection reference marks 15. Thus, in some cases, the three-dimensional objects 500 cannot be densely placed on the printing table T depending on the size of the three-dimensional objects 500 and the size of the reading areas. This limits the number of the three-dimensional objects 500 per print and hence reduces printing efficiency.

Specific Example of Detection Reference Marks

With reference to FIGS. 6 to 11, a description will be given of a specific example and others of the detection reference marks applied to the three-dimensional object printing system S1 according to the present embodiment.

Figure 7:
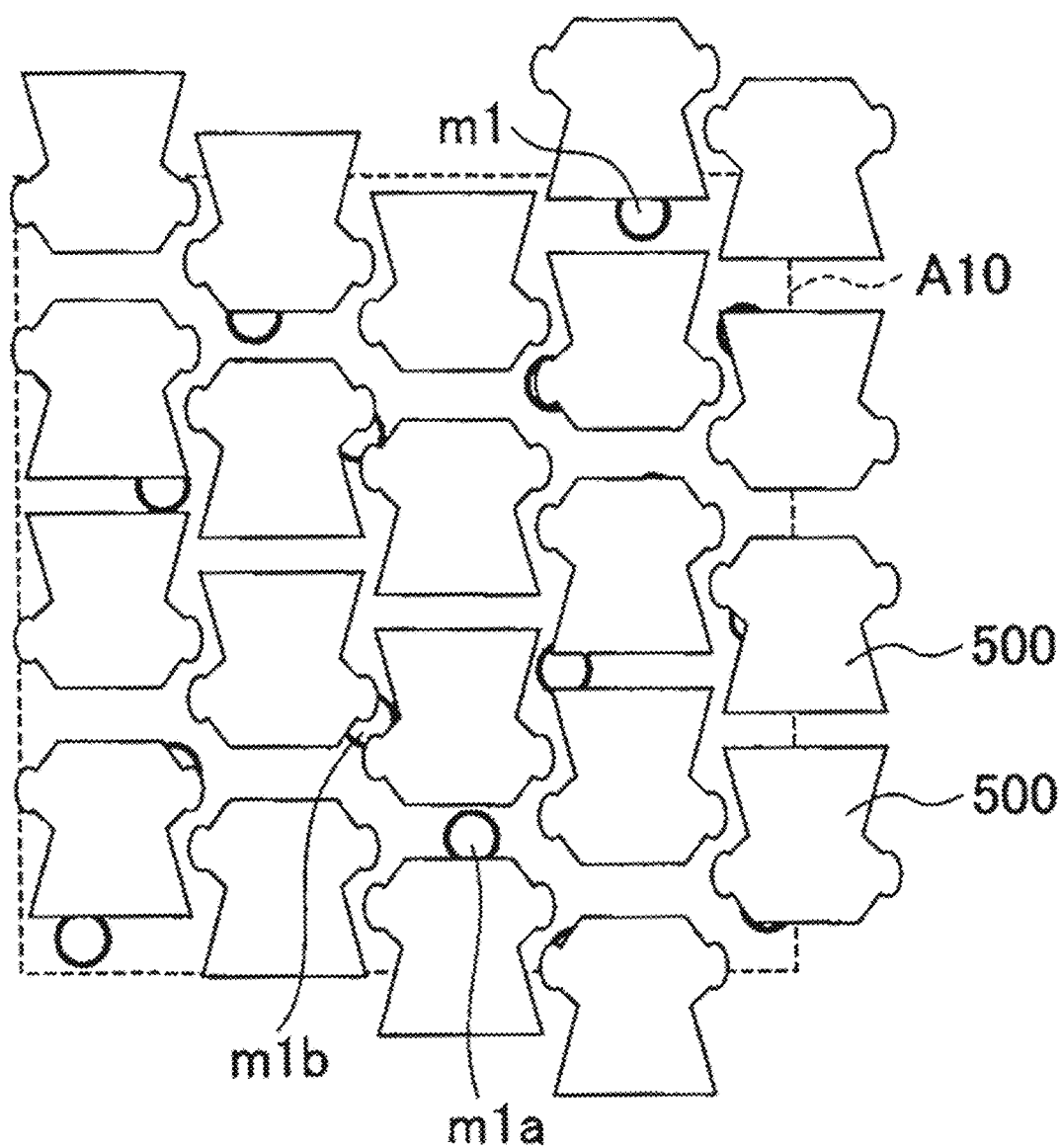
FIG. 7 is a plan view of an exemplary disposition of three-dimensional objects.
Figure 8A:
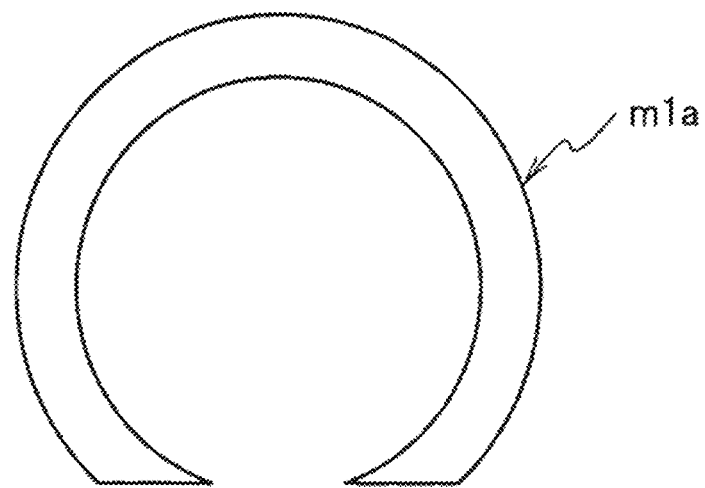
FIGS. 8A and 8B are each an explanatory illustration for an example of obtaining the center from a detection reference mark.
Figure 8B:
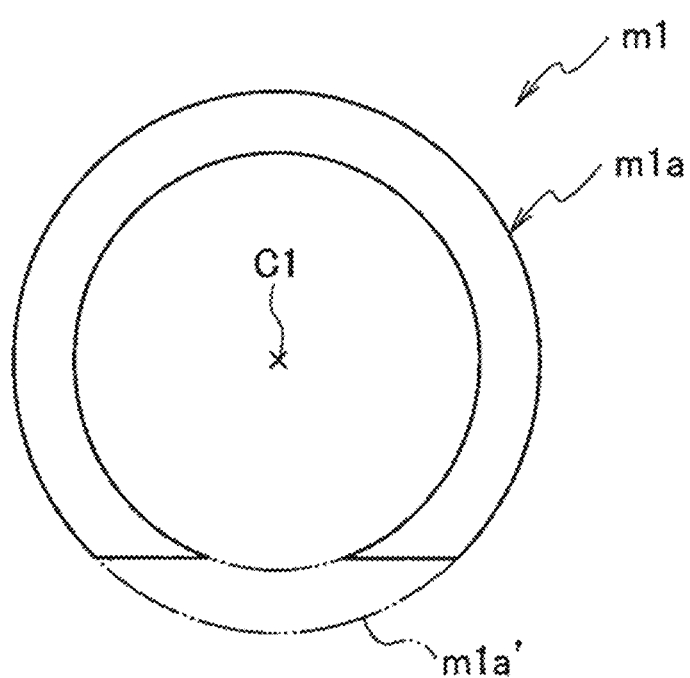
Figure 9A:
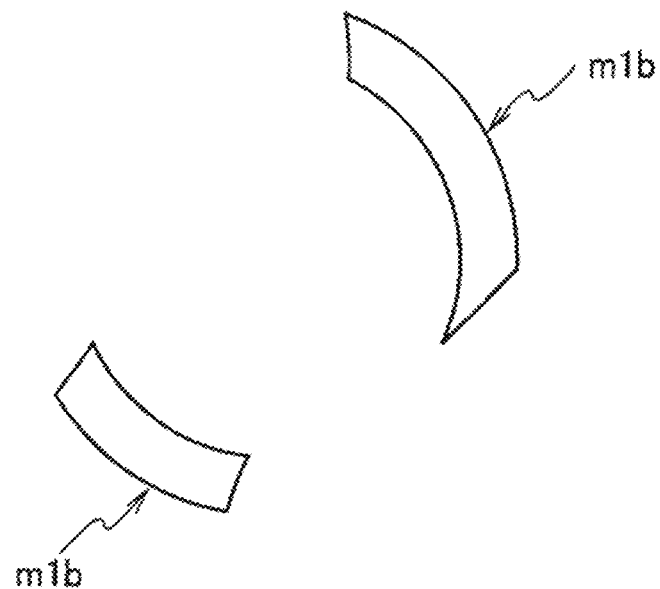
FIGS. 9A and 9B are each an explanatory illustration for other example of obtaining the center from a detection reference mark.
Figure 9B:
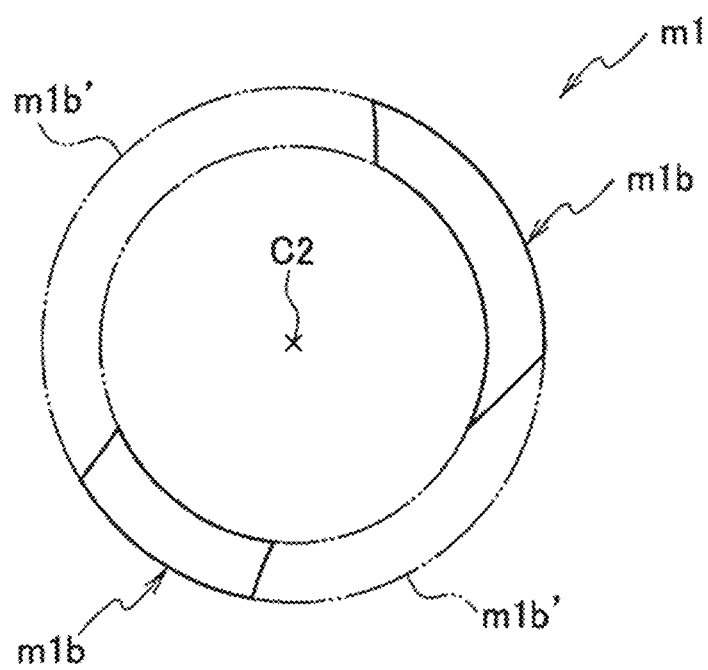
Figure 10A:
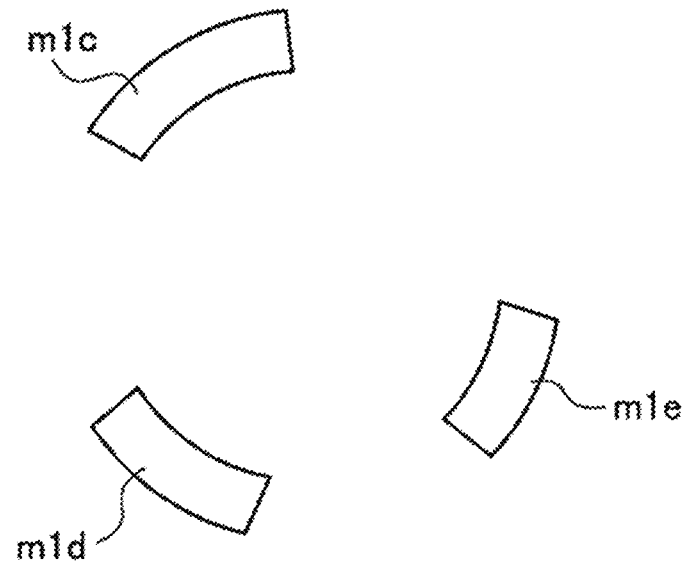
FIGS. 10A and 10B are each an explanatory illustration for another example of obtaining the center from a detection reference mark.
Figure 10B:
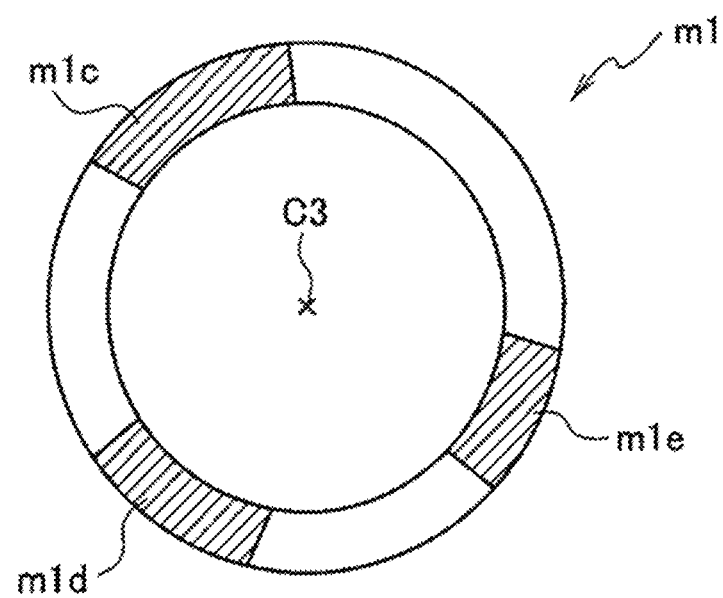
Figure 11:
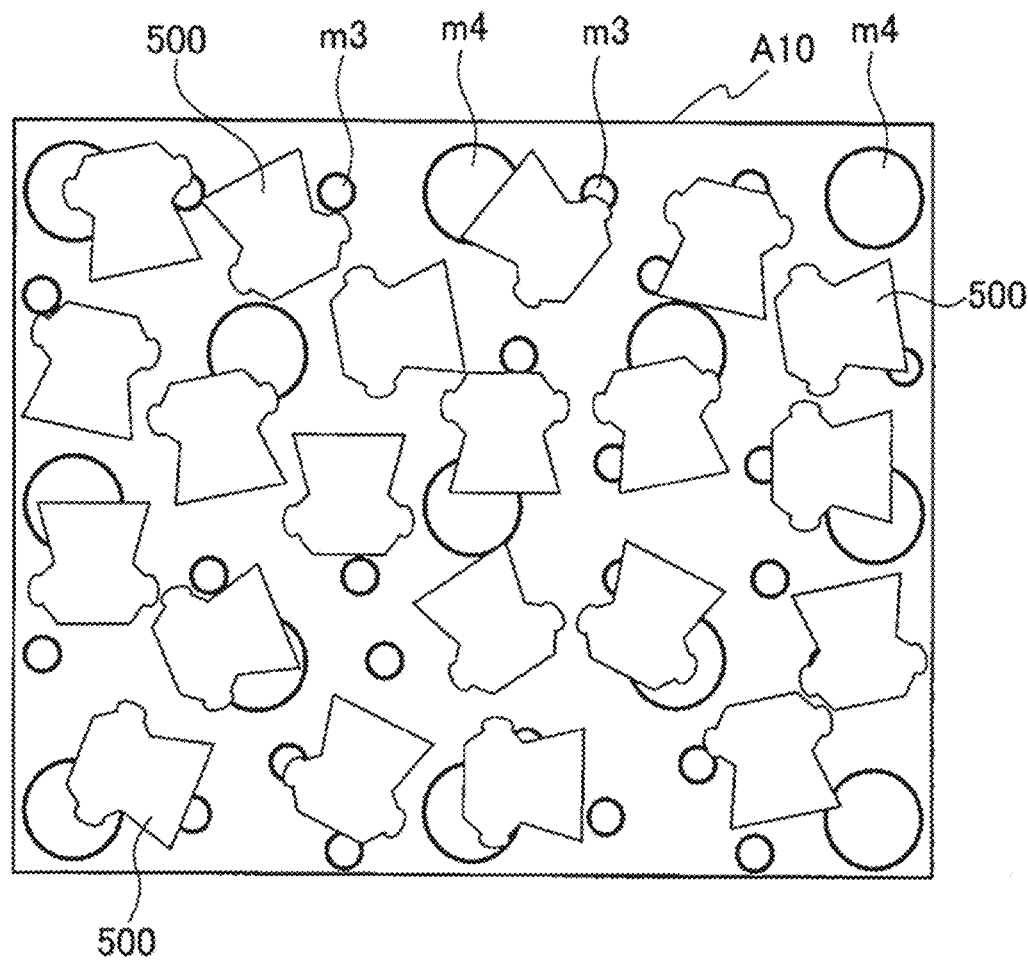
FIG. 11 is a plan view of other exemplary disposition of three-dimensional objects.

FIGS. 6A and 6B are each a plan view of a formation example of the detection reference marks m1 of the three-dimensional object printing system S1 according to the present embodiment. FIG. 7 is a plan view of an exemplary disposition of the three-dimensional objects 500 in the three-dimensional object printing system S1. FIGS. 8A and 8B are each an explanatory illustration for an example of obtaining the center from a detection reference mark m1. FIGS. 9A and 9B are each an explanatory illustration for other example of obtaining the center from a detection reference mark m1. FIG. 10 is an explanatory illustration for another example of obtaining the center from a detection reference mark m1. FIG. 11 is a plan view of other exemplary disposition of the three-dimensional objects 500 in the three-dimensional object printing system S1.

As in FIGS. 6A and 6B, twenty-three circular detection reference marks m1 or filled-circular detection reference marks m2 each having a diameter of 6 mm are arranged at substantially regular intervals within a prescribed reading area A10 (for example, 70 mm×75 mm) set on the printing table T.

Note that, the detection reference marks m1, m2 may be in any color.

In the example in FIGS. 6A and 6B, the size of the detection reference marks m1, m2 each have a diameter of, for example, about 6 mm.

When the area of the detection area is, for example, 70 mm×75 mm, at least three detection reference marks m1, m2 are necessary for carrying out detection in this area. Accordingly, the detection reference marks m1, m2 preferably have a diameter of about 3 mm to 30 mm, and about 60 mm at the maximum.

The preferable number of detection reference marks m1, m2 depends on the diameter.

That is, when the detection reference marks m1, m2 are relatively small in size, a greater amount of the contour information is highly possibly hidden by the placed three-dimensional objects. Therefore, a greater number of the detection reference marks m1, m2 are necessary.

On the other hand, when the detection reference marks m1, m2 are relatively large in size, part of the contour of the detection reference marks m1, m2 is highly possibly seen between the placed three-dimensional objects. Therefore, despite the relatively smaller number of the detection reference marks m1, m2, the contour necessary to determine the minimum three reference points can be acquired with ease.

Here, in the case where the center of a circle is to be obtained from part of the contour, for precision, the contour information of about ⅛ as great as the whole circumference of the circle is desirably necessary. Therefore, when the detection reference marks m1, m2 each have a diameter of about 30 mm, the number of the detection reference marks m1, m2 is preferably 4 to 8.

On the other hand, when the detection reference marks m1, m2 each have a diameter of about 6 mm, in order to improve the visibility of the contours of the detection reference marks m1, m2 between the placed three-dimensional objects, the detection reference marks m1, m2 are desirably disposed densely.

The coordinates information defined for each of the detection reference marks m1, m2 is used as the reference. Therefore, the preferable interval is determined according to the position precision of the detection area (the shift precision of the detecting means 101).

For example, when the position precision of the detection area is ±5 mm, the interval between the detection reference marks m1, m2 is desirably about 10 mm or more. Accordingly, when the detection area is 70 mm×75 mm and the detection reference marks m1, m2 each have a diameter of about 6 mm, the detection reference marks m1, m2 are preferably disposed by about 30 to 50 in number.

In this manner, the shape, size, position and number of the detection reference marks m1, m2 are set so that part or all of the detection reference marks m1, m2 is detected between the three-dimensional objects 500 by the detecting means 101 when the three-dimensional objects 500 are arbitrarily placed on the printing table T.

While the shape of the detection reference marks m1, m2 is not specified to a circle, when the shape is a circle, the center is obtained with ease from the contour of the circle. As compared to other shapes, the accuracy in specifying the position is maintained with ease.

Here, FIGS. 8 and 9 show an example of detecting the positional information of a detection reference mark m1 from detection reference mark parts m1$a$, m1$b$ which can be detected at locations not hidden by the three-dimensional objects 500.

As in FIGS. 8A and 9A, arcs m1$a$', m1$b$' hidden by the three-dimensional objects 500 are estimated based on the arc information of arc parts m1$a$, m1$b$ of the detection reference mark. Then, the center C1, C2 is obtained for the circular detection reference mark m1 that is obtained by complementing the arc parts m1$a$, m1$b$ with the arcs m1$a$', m1$b$'.

By performing such a process on each of the detection reference marks, the positional information of each three-dimensional object 500 is acquired based on the center C1, C2 of the detection reference mark m1.

In an example in FIG. 10, the coordinates of the center C3 of a circular mark m1 is calculated and obtained based on the contour images m1$c$ to m1$e$ of the circular mark read by the detecting means 101 and the previously stored information of the arc shape of the detection reference mark m1.

By performing such a process on each of the detection reference marks, the positional information of each three-dimensional object 500 is acquired based on the center C3 of each detection reference mark m1.

The filled circular marks m2 are similarly processed.

In order to avoid any erroneous detection caused by similarity between part of the contour information of the three-dimensional objects and the image information of the part of the detection marks, the size, the disposition, and the filling chromaticity information of the detection marks may be determined in association with the arc information included in the contour information of each three-dimensional object.

In some cases, a line is easier to be differentiated from the contour information of the three-dimensional object. In such cases, each detection mark is preferably a plurality of lines with intersections such as "x" mark.

It is not necessary to acquire the positional information of every detection reference mark m1. The detection reference may be acquired by collating between the positional information of the acquired ones of detection reference marks m1 and arrangement information according to a predetermined rule.

Figure 14:
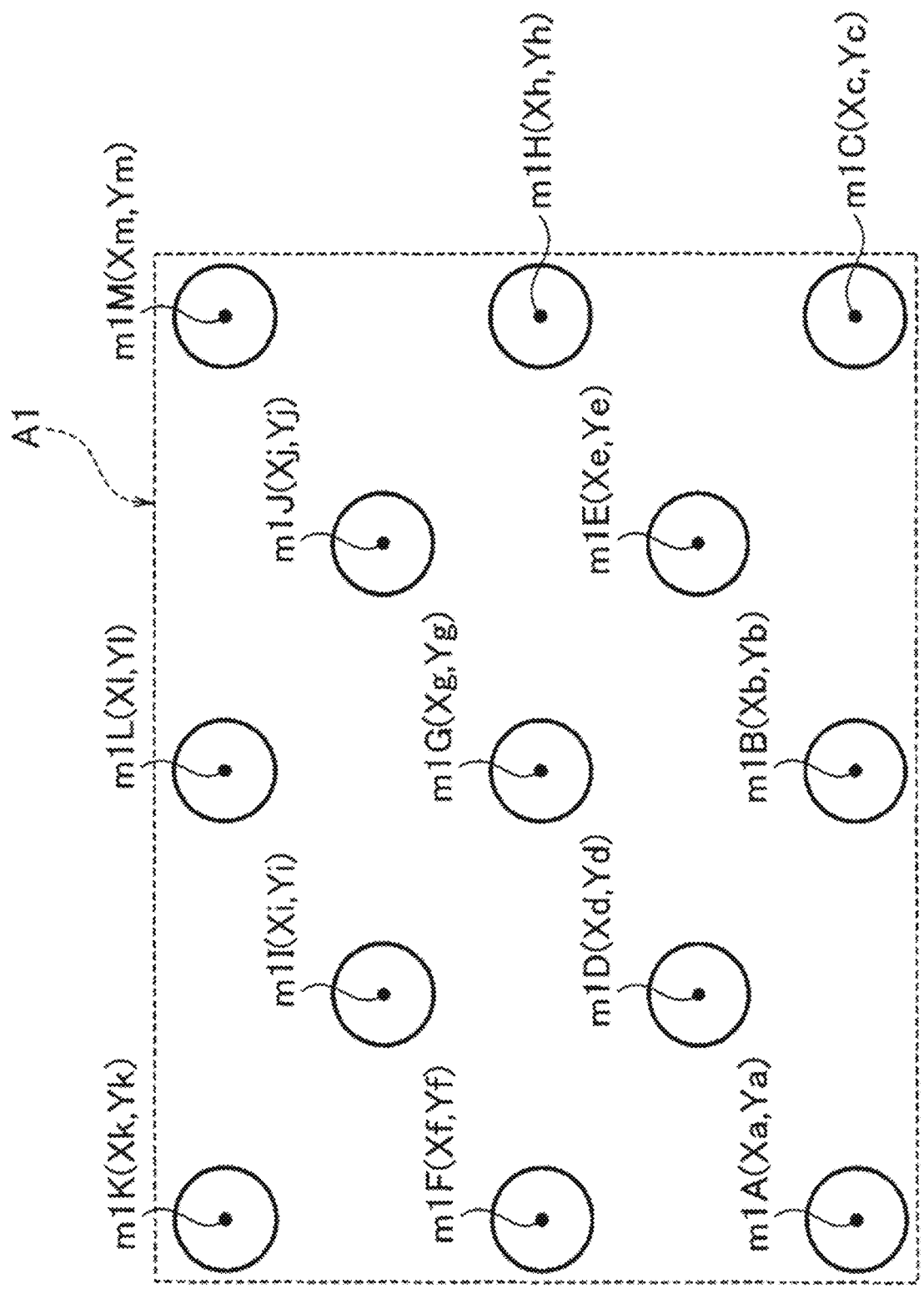
FIG. 14 is an explanatory illustration for the scheme of determining the reference points.

For example, as in FIG. 14, within one reading area A1, coordinates (Xa, Ya) of the position of each of the detection reference marks m1A to m1M are previously determined. Thus, the reference coordinate axes in the area A1 can be determined by detecting the center for at least two detection marks m1A to m1M.

Furthermore, as in FIG. 11, the color or lightness of the detection reference marks m3, m4 desirably does not affect the contour contrast of the three-dimensional objects 500.

By the detection reference marks m3, m4 having proper colors (for example, blue and red), the accurate image information is acquired with the detection reference and the contour of the three-dimensional objects 500.

In the embodiment, the three-dimensional objects 500 and others are disposed so as not to entirely cover the detection reference marks. Here, when a three-dimensional object 500 entirely covers a detection reference mark due to its size, shape, disposed position, or rotation angle, the coordinates of the area may be determined based on the coordinates information of the surrounding reading areas.

Furthermore, there may be provided a process determining step such as stopping or prohibiting printing in a reading area.

Furthermore, in the present embodiment, part or all of the detection reference marks m (m1 to m4), m2, m3 includes: part or all of the detection reference marks m (m1 to m4), m2, m3; and one or a plurality of detection reference mark(s) m (m1 to m4), m2, m3.

Figure 15:
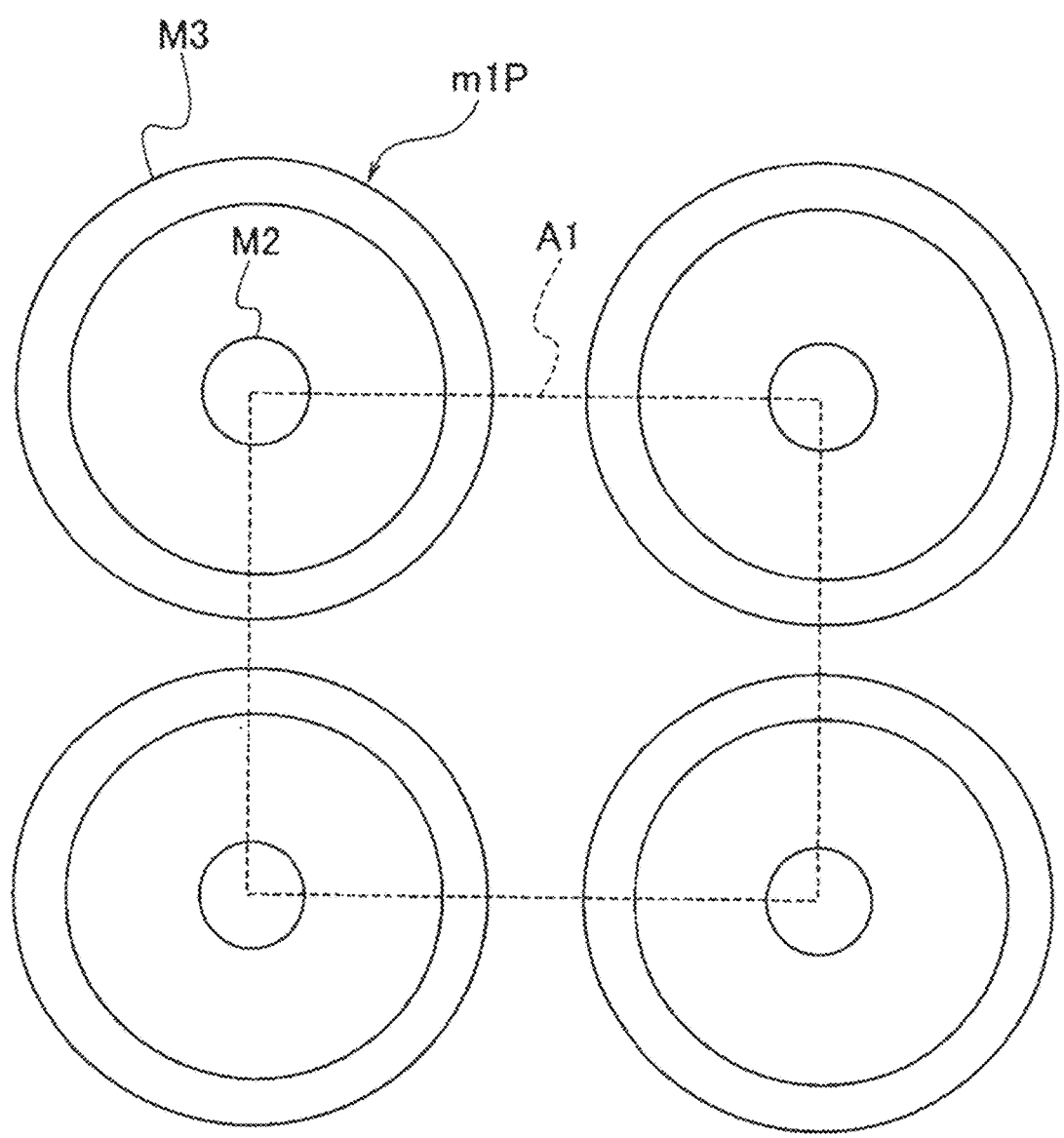
FIG. 15 is an explanatory illustration of other exemplary configuration of the detection reference marks.

Furthermore, as in FIG. 15, at the four corners of the reading area A1, doughnut-like detection reference marks m1P each made up of a center M2 (in cyan, for example) and a ring part M3 (in magenta, for example) concentric to the center M2 may be disposed. This allows high-precision printing on three-dimensional objects.

Note that, in the foregoing, each detection reference mark is outlined by the contour and has its center. Here, when the detection reference mark has a shape including lines, the intersection may be employed as the reference coordinates.

In the foregoing, a specific description has been given of the embodiment of the present invention. The embodiment disclosed in the description is illustrative in every respect and the present invention is not limited to the disclosed technique. The technical scope of the present invention should not be construed as limiting based on the description of the embodiment and to be construed just by the scope of claims. The present invention covers the technique equivalent to the technique disclosed in the claims and any changes that can be made within the scope of the claims.

For example, the detecting means 101 may acquire the contour information of each three-dimensional object 10 using backlight. In particular, when the material of the three-dimensional objects 10 is shiny such as metal, the contour information may not be accurately acquired with reflecting illumination. Using transmissive light of backlight, the detecting means 101 can acquire accurately the contour information of the three-dimensional objects 10 made of metal.

The printing means 103 is not specified to an UV inkjet printer, and may be a printer of any of various printing schemes.

The control means 104 is not specified to a work station, and may be a personal computer or the like.

The 3D sensor may be replaced by a 2D sensor.

The present invention is applicable to a mode in which the printing table also functions as means for transferring the three-dimensional object, such as an endless belt.

In the present embodiment, a plurality of three-dimensional objects 10 are directly placed on the printing table T. The present invention is not limited thereto. For example, a plurality of fixing jigs may be disposed on the printing table T while avoiding covering all of the detection reference marks m on the printing table T. Then, one or a plurality of three-dimensional object(s) 10 may be placed on each fixing jig. That is, when the fixing jigs each having one or a plurality of three-dimensional object(s) 10 placed on are used, part of the plurality of detection reference marks m may be covered with the fixing jigs.

Here, one detection reference mark m may be completely covered with a fixing jig, or one detection reference mark m may be partially covered with a fixing jig.

Note that, the three-dimensional object 10 placed on the fixing jig is placed at a higher level than the printing table T by the height of the fixing jig. Accordingly, the printing data generating means 102 preferably generates the printing data of each three-dimensional object 10 taking the height of the fixing jig into account.

Furthermore, the detection reference mark m may be directly printed on a fixing jig (a first fixing jig). Here, the first fixing jig may have a recess for fixing a fixing jig (a second fixing jig) of a smaller size. One or a plurality of recess(s) is disposed at a position other than the detection reference mark m printed on the first fixing jig. One or a plurality of three-dimensional object(s) 10 is placed on each second fixing jig.

Here, the three-dimensional object 10 may be disposed at a lower position than the detection reference mark m printed on the first fixing jig. Accordingly, the printing data generating means 102 preferably generates the printing data of each three-dimensional object 10 taking into account of the height (depth) of the three-dimensional object 10 with reference to the detection reference mark m.

Furthermore, the optical sensor 200 may further include illumination means that provides preferable shadow for acquiring the shadow information corresponding to the unevenness of the three-dimensional object 10. The optical sensor 200 is, for example, illumination means that diagonally projects light to the three-dimensional objects 10. By the illumination means diagonally projecting light to the three-dimensional object 10, the shadow information of the three-dimensional object 10 is acquired. Thus, variations in the three-dimensional posture of the three-dimensional objects 10 disposed on the printing table T or the fixing jigs is acquired. For example, when the surface of each three-dimensional object 10 has unevenness, the printing data generating means 102 can generate the printing data of each three-dimensional object 10 not only based on the detection reference marks m but also based on the shadow information of each three-dimensional object 10 instead of or in addition to the contour information of each three-dimensional object 10 described above with reference to FIGS. 3A and 3B. Thus, in the case where the three-dimensional objects 10 vary in their three-dimensional posture also, printing can be carried out at higher precision.

REFERENCE SIGNS LIST

S1 three-dimensional object printing system
m (m1 to m4), m1P, m2, m3 detection reference mark
A1 to A8 reading area
T printing table
10, 500 three-dimensional object
101 detecting means
102 printing data generating means
102A first generating means
102B second generating means
103 printing means
104 control means
105 specifying means
200 optical sensor (3D sensor)

The invention claimed is:

1. A three-dimensional object printing system configured to apply a printing medium onto surfaces of three-dimensional objects, the three-dimensional object printing system comprising:
   a printing table having a plurality of detection reference marks thereon;
   a detector;
   a printing data generator; and
   a printer;
   wherein the detector is configured to detect 1) positions and orientations of three-dimensional objects that have been placed on the printing table in a manner that hides and/or partially hides from observation some of said detection reference marks, and 2) detection reference marks, among said plurality of detection reference marks, that remain visible and/or partially visible through gaps between the three-dimensional objects that have been placed on the printing table;
   the printing data generator is configured to determine reference coordinates of the detected visible and/or partially visible detection reference marks and to generate printing data specific to each of the three-dimensional objects that have been placed on the printing table based on the positions and orientations of the three-dimensional objects and the reference coordinates of the visible and/or partially visible detection reference marks that have been detected by the detector; and
   the printer is configured to apply the printing medium onto the surfaces of each of the three-dimensional objects that have been placed on the printing table using the printing data generated by the printing data generator that is specific to each of the three-dimensional objects that have been placed on the printing table.

2. The three-dimensional object printing system according to claim 1, wherein the detection reference marks are located on a support surface of the printing table and the three-dimensional object printing system further comprises a jig configured to support the three-dimensional objects above the printing table support surface,
the printing data generator is further configured to generate the printing data based on a height of the jig, and
the printer is configured to apply the printing medium onto the surfaces of each of the three-dimensional objects with the jig placed on the support surface of the printing table and covering some of the detection reference marks.

3. The three-dimensional object printing system according to claim 2, wherein
the detection reference marks each have a circular shape, and
the printing data generator is configured to determine the reference coordinates of the detected visible and/or partially visible detection reference marks based on a degree of matching between a contour image of the visible and/or partially visible detection reference marks that have been detected by the detector and previously stored information of an arc shape of the detection reference marks.

4. The three-dimensional object printing system according to claim 1, wherein
the detection reference marks each have a circular shape, and
the printing data generator is configured to determine the reference coordinates of the detected visible and/or partially visible detection reference marks based on a degree of matching between a contour image of the detected visible and/or partially visible detection reference marks and previously stored information of an arc shape of the detection reference marks.

5. A three-dimensional object printing method comprising:
placing a plurality of three-dimensional objects on a printing table having a plurality of detection reference marks thereon in a manner that 1) hides and/or partially hides some of said detection reference marks from observation and 2) leaves others of said detection reference marks visible and/or partially visible through gaps between the three-dimensional objects that have been placed on the printing table;
detecting positions and orientations of the three-dimensional objects that have been placed on the printing table and the detection reference marks, among said plurality of detection marks, that remain visible and/or partially visible through said gaps between the three-dimensional objects that have been placed on the printing table;
determining reference coordinates of the detected visible and/or partially visible detection reference marks and generating printing data specific to each of the three-dimensional objects that have been placed on the printing table based on the positions and orientations of the three-dimensional objects and the reference coordinates of the visible and/or partially visible detection reference marks that have been detected, and
applying a printing medium onto surfaces of each of the three-dimensional objects that have been placed on the printing table using the printing data that is specific to each of the three-dimensional objects that have been placed on the printing table.

6. The three-dimensional object printing method according to claim 5, wherein the plurality of three-dimensional objects are supported on the printing table via a jig and the printing data is generated based on a height of the jig.

* * * * *